United States Patent
Matsuo et al.

[11] Patent Number: 6,127,647
[45] Date of Patent: Oct. 3, 2000

[54] METHODS OF AND APPARATUS FOR WELDING WORKPIECE WITH LASER BEAMS

[75] Inventors: Kazuhide Matsuo; Takanori Fujii, both of Kawagoe; Kenji Makihara, Sayama, all of Japan

[73] Assignee: Honda Giken Kogyo Kabushiki Kaisha, Tokyo, Japan

[21] Appl. No.: 09/111,863

[22] Filed: Jul. 8, 1998

[30] Foreign Application Priority Data

Jul. 10, 1997  [JP]  Japan ................................ 9-185277

[51] Int. Cl.⁷ .................................................. B23K 26/00
[52] U.S. Cl. ................................ 219/121.63; 219/121.64; 219/121.76
[58] Field of Search .................. 219/121.76, 121.63, 219/121.64, 121.77

[56] References Cited

U.S. PATENT DOCUMENTS

| | | | |
|---|---|---|---|
| 4,237,364 | 12/1980 | Lemelson | 219/121.63 |
| 4,572,941 | 2/1986 | Sciaky et al. | 219/121.64 |
| 4,654,505 | 3/1987 | Sciaky et al. | 219/121.63 |
| 4,820,899 | 4/1989 | Hikima et al. | 219/121.76 |
| 4,857,697 | 8/1989 | Melville | 219/121.76 |
| 4,873,417 | 10/1989 | Moriyasa et al. | 219/121.76 |
| 5,115,115 | 5/1992 | Alborante | 219/121.63 |

FOREIGN PATENT DOCUMENTS

| | | | |
|---|---|---|---|
| 276664 | 1/1988 | European Pat. Off. | 219/121.76 |
| 63-273582 | 11/1988 | Japan . | |
| B2 4-36792 | 6/1992 | Japan . | |
| 4-220187 | 8/1992 | Japan . | |

*Primary Examiner*—Geoffrey S. Evans
*Attorney, Agent, or Firm*—Birch, Stewart, Kolasch & Birch, LLP

[57] ABSTRACT

A laser beam welding apparatus has a first laser oscillator for applying a laser beam to a right-hand automobile door, a second laser oscillator for applying a laser beam to a left-hand automobile door, and first through fourth laser beam path changing mechanisms for changing the laser beam path of the laser beam from the first laser oscillator in the event of a failure of the second laser oscillator, and changing the laser beam path of the laser beam from the second laser oscillator in the event of a failure of the first laser oscillator. Even when one of the laser beam oscillators fails to operate due to a malfunction, an overall welding line combined with the laser beam welding apparatus does not need to be shut down, and the laser beam welding apparatus can smoothly and efficiently weld the workpieces.

5 Claims, 7 Drawing Sheets

METHODS OF AND APPARATUS FOR WELDING WORKPIECE WITH LASER BEAMS

BACKGROUND OF THE INVENTION

1. Field of the Invention

The present invention relates to a method of and an apparatus for applying laser beams emitted from a plurality of laser oscillators to respective regions of a workpiece to weld those regions.

2. Description of the Related Art

It has been attempted to weld inner and outer panels of an automobile body with a laser beam welding robot rather than a resistance spot welding robot. For examples Japanese laid-open patent publication No. 4-220187 discloses a laser beam welding robot having a laser beam applying head mounted on the distal end of a robot arm, the laser beam applying head being movable closely to a region of a workpiece which is to be welded for welding the workpiece.

However, since the laser beam applying head is positioned closely to the region of the workpiece to be welded, it is difficult to move the laser beam applying head at a high speed.

Another welding apparatus disclosed in Japanese patent publication No. 4-36792 has a plurality of welding heads disposed closely to a region of a workpiece which is to be welded. A desired one of the welding heads is selected by adjusting the angle of a plane mirror, and a laser beam is applied via the selected welding head to the region of the workpiece to be welded for thereby welding the workpiece.

The disclosed welding apparatus has a plurality of laser oscillators to be associated with all regions of a workpiece which are to be welded. If one of the laser oscillators fails to operate due to a malfunction, then the welding process in the region covered by the malfunctioning laser oscillator is interrupted. Therefore, in the event of a failure of one of the laser oscillators, the entire welding line that is combined with the welding apparatus needs to be shut down. Since it is time-consuming to repair or replace the malfunctioning laser oscillator, the entire welding line is made less efficient than it should be.

SUMMARY OF THE INVENTION

It is a primary object of the present invention to provide a method of and an apparatus for welding a workpiece efficiently and smoothly without the need to shut down a welding line even in the event of a malfunction of a laser oscillator.

The above and other objects, features, and advantages of the present invention will become more apparent from the following description when taken in conjunction with the accompanying drawings in which preferred embodiments of the present invention are shown by way of example.

DETAILED DESCRIPTION OF THE PREFERRED EMBODIMENTS

Figure 1:
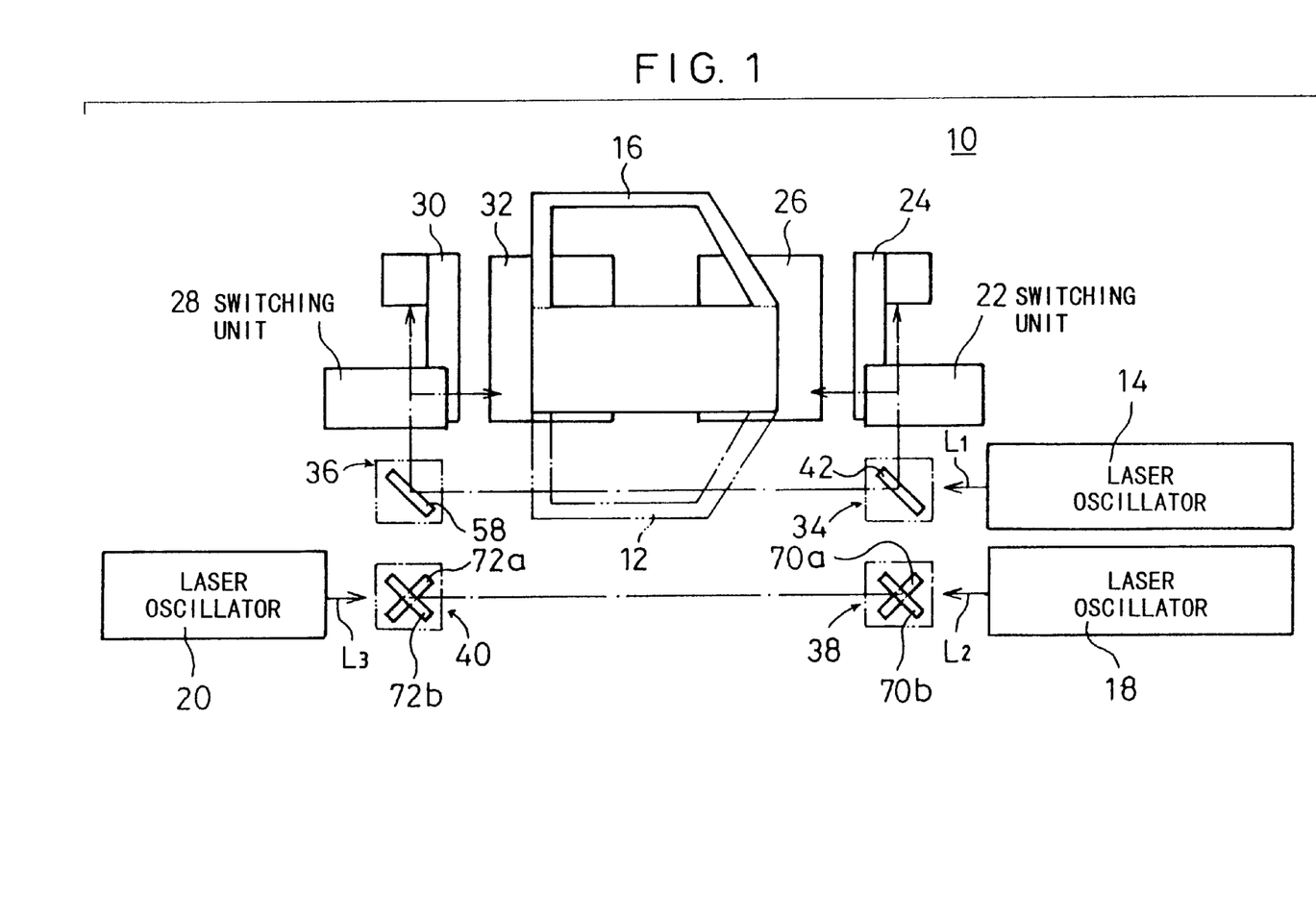
FIG. 1 is a schematic plan view of a laser beam welding apparatus according to a first embodiment of the present invention.

FIG. 1 schematically shows a laser beam welding apparatus 10 according to a first embodiment of the present invention, for carrying out a method of welding a workpiece with a laser beam according to the present invention.

As shown in FIG. 1, the laser beam welding apparatus 10 comprises a first laser oscillator 14 for applying a laser beam $L_1$ to a right-hand automobile door 12 as a workpiece, a second laser oscillator 18 for applying a laser beam $L_2$ to a left-hand automobile door 16 as a workpiece, and a third laser oscillator 20 for applying a laser beam $L_3$ selectively to the right-hand automobile door 12 and the left-hand automobile door 16.

The laser beam $L_1$ emitted from the first laser oscillator 14 travels along a laser beam path in which there are disposed a first beam switching unit 22 and first and second remote heads 24, 26 for applying the laser beam $L_1$ selectively guided from the first beam switching unit 22 to respective regions of the right-hand automobile door 12 to weld the same.

The laser beam $L_2$ emitted from the second laser oscillator 18 travels along a laser beam path in which there are disposed a second beam switching unit 28 and third and fourth remote heads 30, 32 for applying the laser beam $L_2$ selectively guided from the second beam switching unit 28 to respective regions of the left-hand automobile door 16 to weld the same.

The laser beam welding apparatus 10 also comprises first and second laser beam path changing mechanisms 34, 36 for changing the laser beam path of the laser beam $L_1$ to apply the laser beam $L_1$ emitted from the first laser oscillator 14 to the left-hand automobile door 16 to be machined by the second laser oscillator 18 when the second laser oscillator 18 fails to operate, and third and fourth laser beam path changing mechanisms 38, 40 for changing the laser beam path of the laser beam $L_2$ or $L_3$ to apply the laser beam $L_2$ or $L_3$ emitted from the second or third laser oscillator 18, 20 to the right-hand automobile door 12 to be machined by the first laser oscillator 14 when the first laser oscillator 14 fails to operate.

Figure 2:
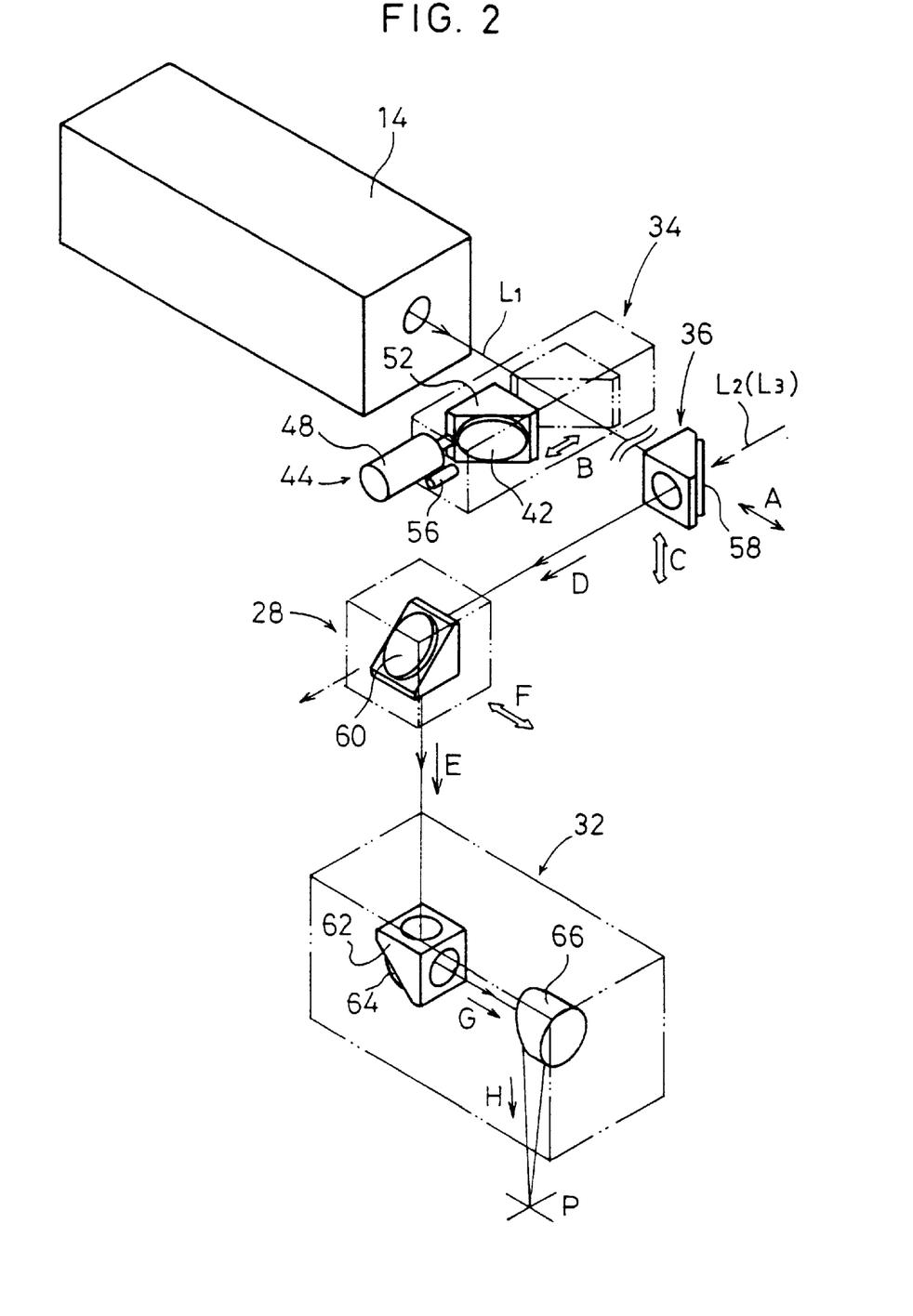
FIG. 2 is an enlarged fragmentary perspective view of the laser beam welding apparatus shown in FIG. 1.
Figure 3:
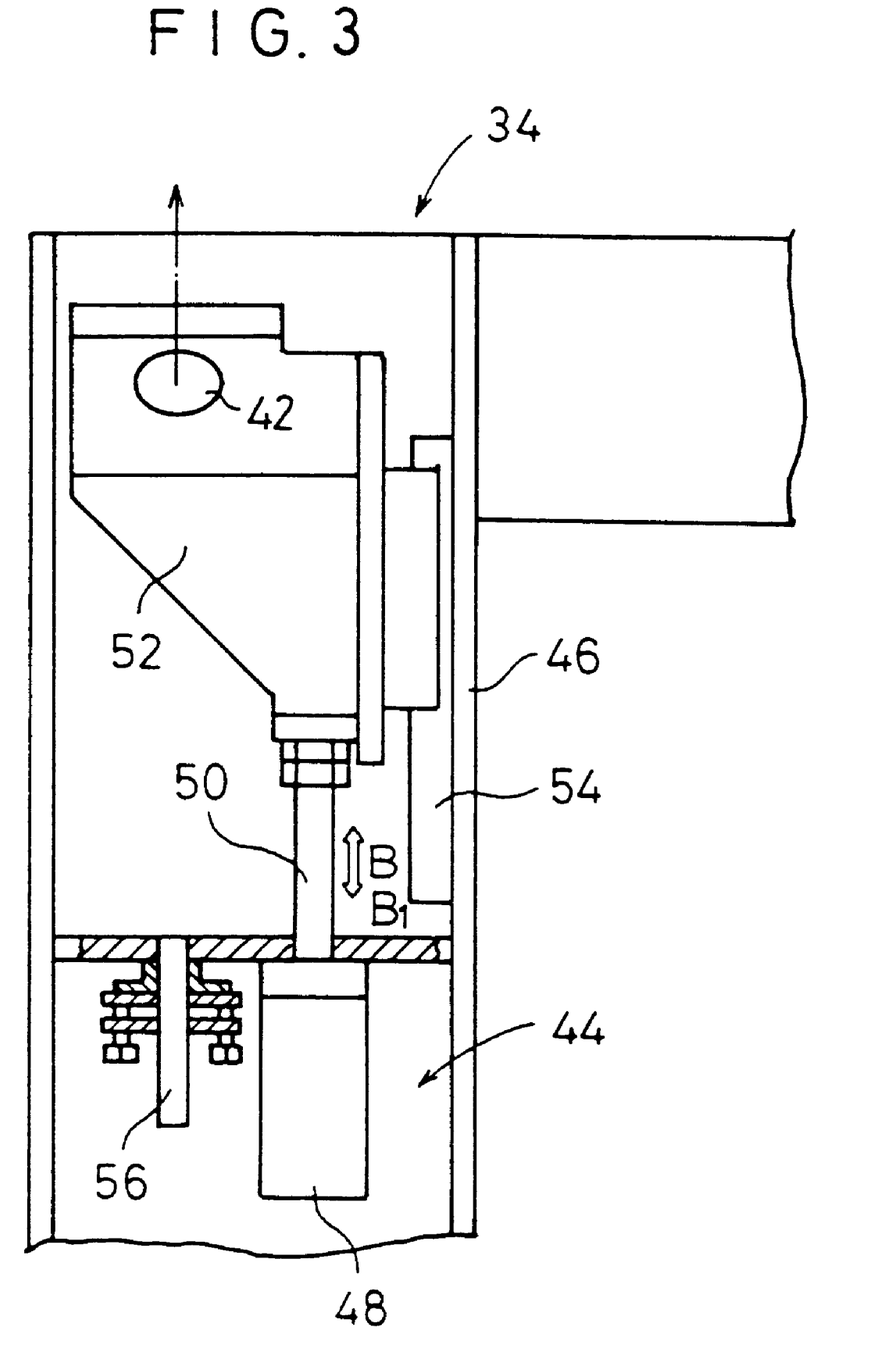
FIG. 3 is a fragmentary longitudinal cross-sectional view of the laser beam welding apparatus.
Figure 4:
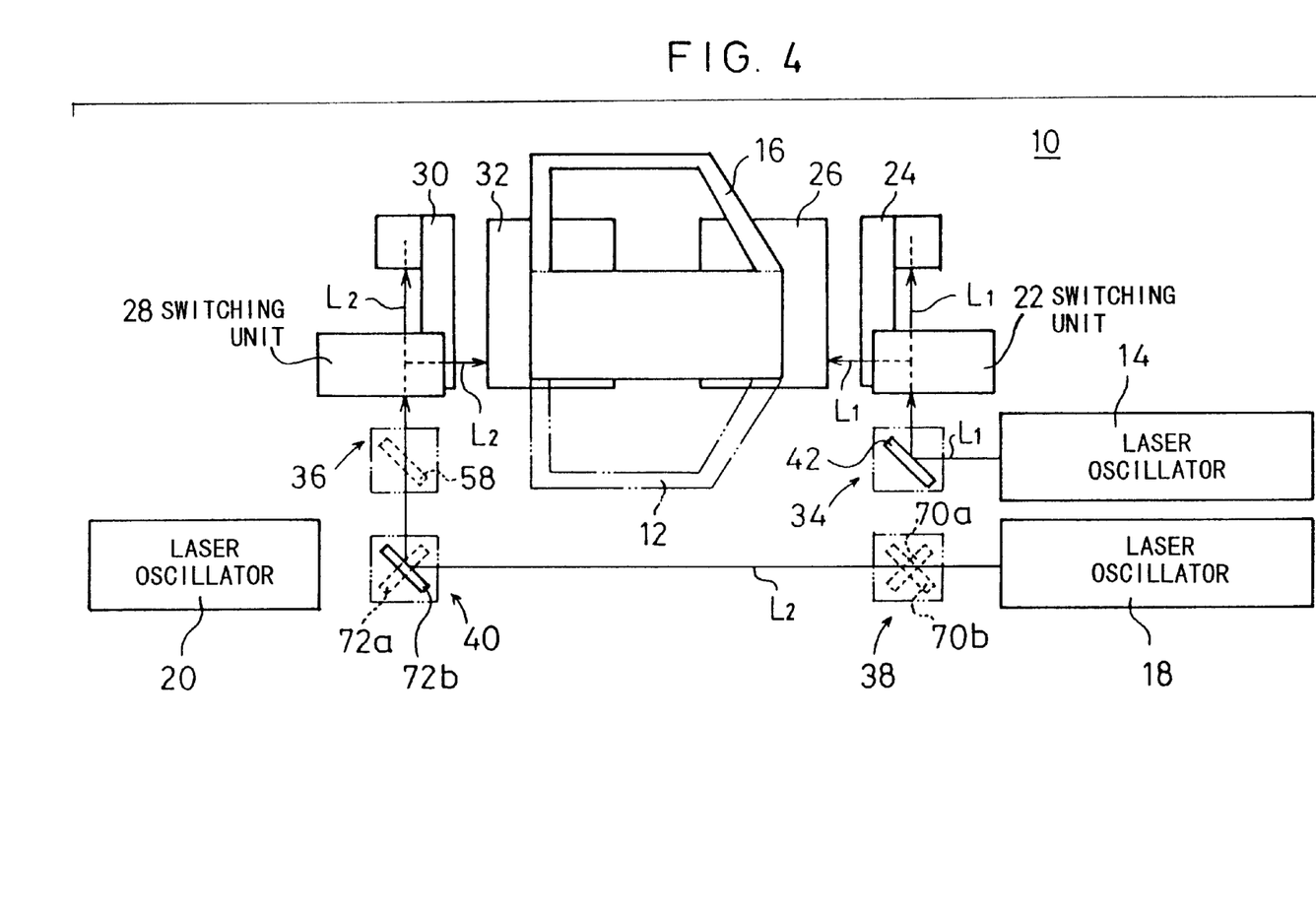
FIG. 4 is a schematic plan view showing the laser beam welding apparatus as it is energized.

As shown in FIGS. 2 and 3, the first laser beam path changing mechanism 34 has a reflecting mirror 42 inclined at a predetermined angle, e.g., 45°, with respect to the optical axis (indicated by the arrow A) of the first laser oscillator 14, and an actuator 44 for moving the reflecting mirror 42 selectively into and out of the optical axis of the first laser oscillator 14.

The actuator 44 has a cylinder 48 fixedly mounted in a casing 46 of the first laser beam path changing mechanism 34 and having a rod 50 extending from the cylinder 48 in the direction indicated by the arrow B which extends perpendicularly to the direction (the optical axis of the first laser oscillator 14) indicated by the arrow A. The reflecting mirror 42 is supported on a block 52 secured to the distal end of the rod 50 and supported on a rail 54 fixedly mounted in the casing 46 for movement in the direction indicated by the arrow B. The casing 46 houses an He—Ne laser unit 56 for aligning the reflecting mirror 42 with the optical axis of the first laser oscillator 14.

The second laser beam path changing mechanism 36 also has a reflecting mirror 58 inclined at a predetermined angle, e.g., 45°, with respect to the optical axis (indicated by the arrow A) of the first laser oscillator 14, and an actuator (not shown) for moving the reflecting mirror 58 selectively into and out of the optical axis of the first laser oscillator 14.

As shown in FIG. 2, the second beam switching unit 28 comprises a reflecting mirror 60 for reflecting the laser beam $L_1$, which has passed through the first laser beam path changing mechanism 34 and been reflected by the reflecting mirror 58 of the second laser beam path changing mechanism 36 to travel in the direction indicated by the arrow D, downwardly in the direction indicated by the arrow E. The reflecting mirror 60 is movable selectively in the direction indicated by the arrow F by a solenoid or the like.

The fourth remote head 32 is disposed in the laser beam path of the laser beam $L_1$ which has been reflected by the second beam switching unit 28 in the direction indicated by the arrow E. The fourth remote head 32 comprises a reflecting mirror 64 fixedly mounted on a block 62 for reflecting the laser beam $L_1$ horizontally in the direction indicated by the arrow G, and a parabolic mirror 66 for reflecting the laser beam $L_1$, which has been reflected by the reflecting mirror 64, downwardly in the direction indicated by the arrow H, and focusing the laser beam $L_1$ onto a welding point P. The first, second, and third remote heads 24, 26, 30 are identical in structure to the fourth remote head 32, and will not be described in detail below.

As shown in FIG. 1, the third and fourth laser beam path changing mechanisms 38, 40 have respective pairs of reflecting mirrors 70a, 70b and reflecting mirrors 72a, 72b which extend at an angle of 90° to each other in each pair. The reflecting mirrors 70a, 70b are vertically stacked in the direction normal to the sheet of FIG. 1, and the reflecting mirrors 72a, 72b are also vertically stacked in the direction normal to the sheet of FIG. 1. The reflecting mirrors 70a, 70b, 72a, 72b are combined with respective actuators which can be operated to move the reflecting mirrors 70a, 70b, 72a, 72b into three positions, i.e., to position the reflecting mirrors 70a, 70b, 72a, 72b out of the optical axis of the second and third laser oscillators 18, 20, to position the reflecting mirrors 70a, 72a in the optical axis of the second and third laser oscillators 18, 20, and to position the reflecting mirrors 70b, 72b in the optical axis of the second and third laser oscillators 18, 20.

Operation of the laser beam welding apparatus 10 will be described below.

A welding process carried out by the first and second laser oscillators 14, 18 will first be described below. The reflecting mirror 42 of the first laser beam path changing mechanism 34 is positioned in the optical axis of the first laser oscillator 14, and the reflecting mirror 72b of the fourth laser beam path changing mechanism 40 is positioned in the optical axis of the second laser oscillator 18. The reflecting mirrors 58, 70a, 70b are positioned out of the respective optical axes.

The first and second laser oscillators 14, 18 are energized to emit laser beams $L_1$, $L_2$, respectively. The laser beam $L_1$ from the first laser oscillator 14 is reflected by the reflecting mirror 42 of the first laser beam path changing mechanism 34 to the first beam switching unit 22. The first beam switching unit 22 guides the laser beam $L_1$ selectively to the first and second remote heads 24, 26, which weld the right-hand automobile door 12 with the laser beam $L_1$.

The laser beam $L_2$ from the second laser oscillator 18 passes through the third laser beam path changing mechanism 38, is reflected by the reflecting mirror 72b of the fourth laser beam path changing mechanism 40, and passes through the second laser beam path changing mechanism 36 to the second beam switching unit 28. The second beam switching unit 28 guides the laser beam $L_2$ selectively to the third and fourth remote heads 30, 32, which weld the left-hand automobile door 16 with the laser beam $L_2$.

Figure 5:
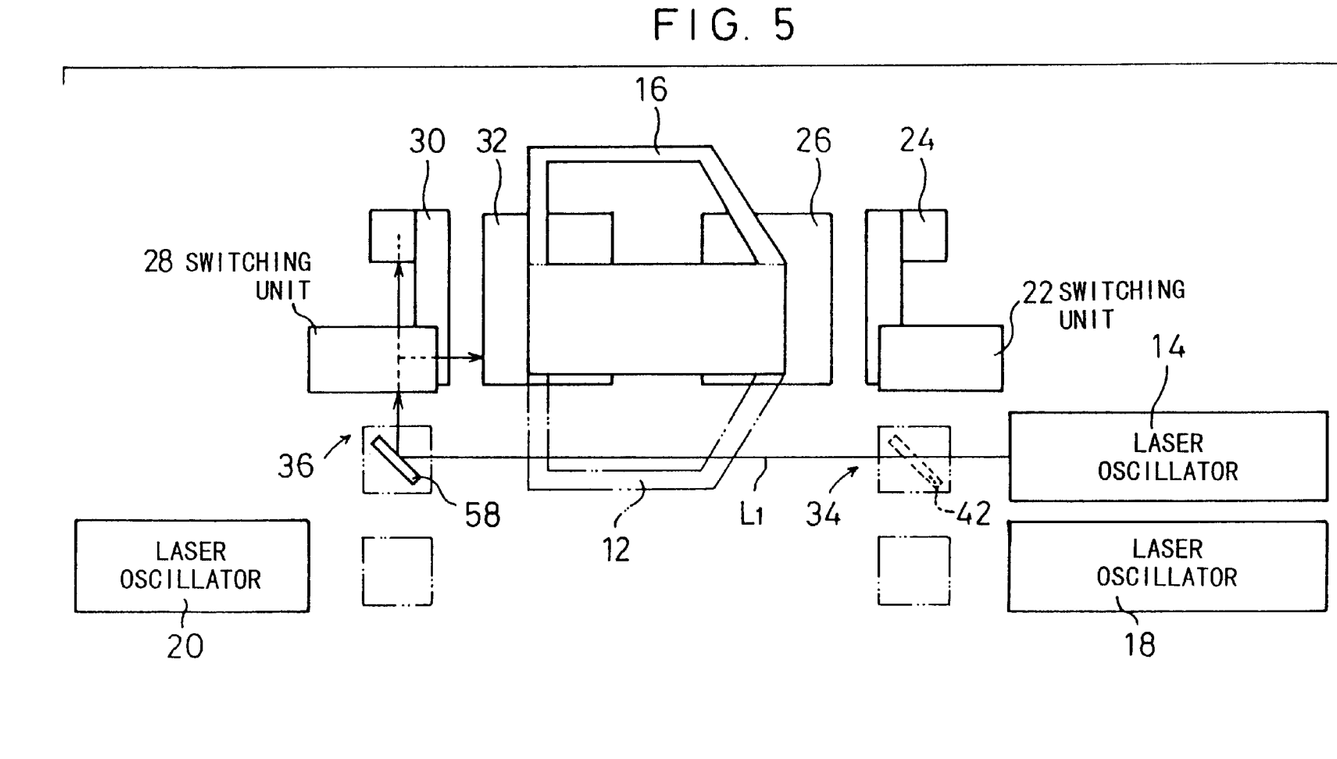
FIG. 5 is a schematic plan view showing the manner in which the laser beam welding apparatus has changed its laser beam path in the event of a malfunction of a laser oscillator.

If the second laser oscillator 18 fails to operate due to a malfunction in the above welding process, then the first laser oscillator 14 can weld the left-hand automobile door 16 which has been welded by the second laser oscillator 18. Specifically, as shown in FIGS. 2 and 5, the reflecting mirror 42 of the first laser beam path changing mechanism 34 is retracted out of the optical axis of the first laser oscillator 14.

More specifically, the cylinder 48 (see FIG. 2) of the actuator 44 is actuated to move the block 52 fixed to the rod 50 along the rail 54 in the direction indicated by the arrow B1 for thereby retracting the reflecting mirror 42 mounted on the block 52 out of the optical axis (indicated by the arrow A) of the first laser oscillator 14. In the second laser beam path changing mechanism 36, the reflecting mirror 58 is displaced in the direction indicated by the arrow C into the optical path of the first laser oscillator 14.

The laser beam $L_1$ from the first laser oscillator 14 passes through the first laser beam path changing mechanism 34, and is reflected by the reflecting mirror 58 of the second laser beam path changing mechanism 36 to the second beam switching unit 28. The second beam switching unit 28 guides the laser beam $L_1$ selectively to the third and fourth remote heads 30, 32, which weld the left-hand automobile door 16 with the laser beam $L_1$.

Figure 6:
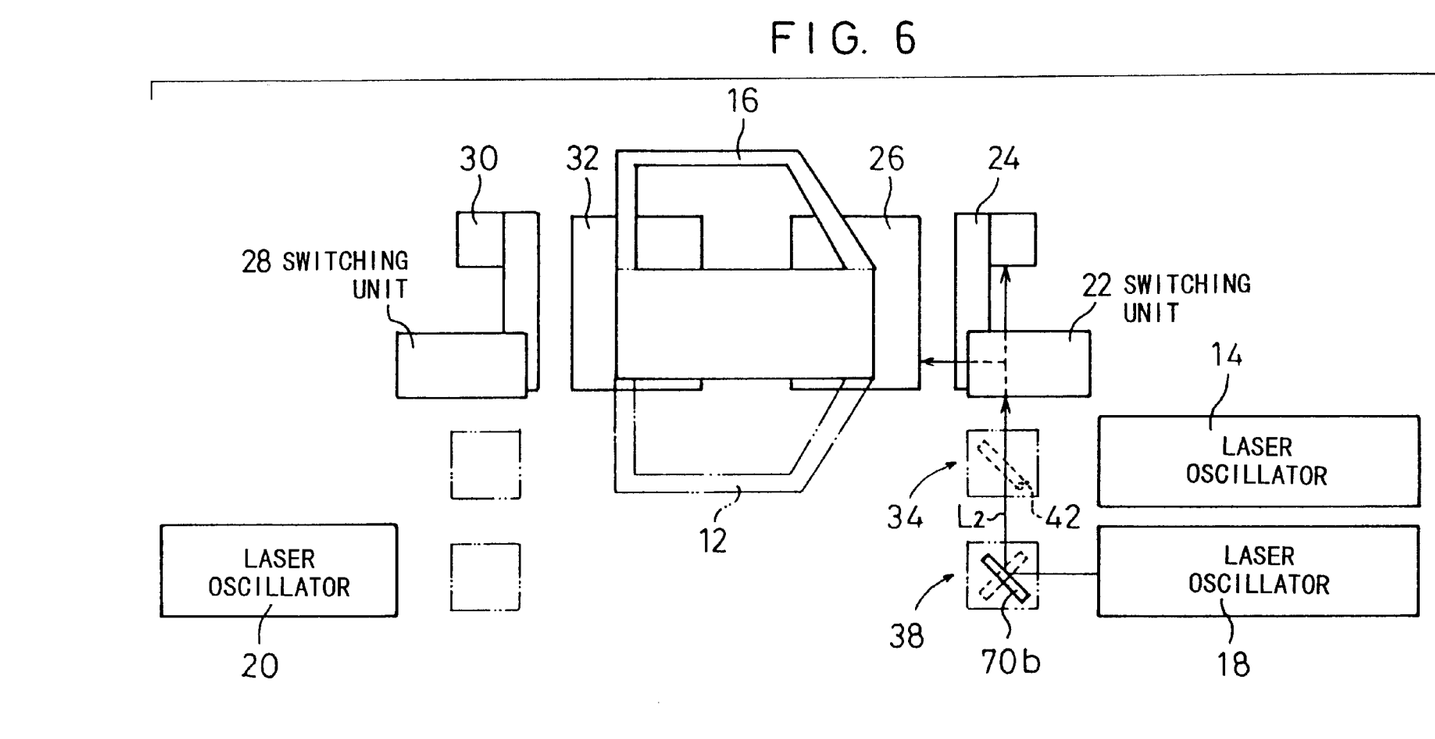
FIG. 6 is a schematic plan view showing the manner in which the laser beam welding apparatus has changed its laser beam path in the event of a malfunction of another laser oscillator.

If the first laser oscillator 14 fails to operate due to a malfunction in the above welding process, then the reflecting mirror 42 of the first laser beam path changing mechanism 34 is retracted out of the optical path of the first laser oscillator 14, and the reflecting mirror 70b of the third laser beam path changing mechanism 38 is positioned in the optical axis of the second laser oscillator 18, as shown in FIG. 6. The laser beam $L_2$ from the second laser oscillator 18 is reflected by the reflecting mirror 70b, and passes through the first laser beam path changing mechanism 34 to the first beam switching unit 22. The first beam switching unit 22 guides the laser beam $L_2$ selectively to the first and second remote heads 24, 26, which weld the right-hand automobile door 12 with the laser beam $L_2$.

In the first embodiment, as described above, the right-hand automobile door 12 is welded by the laser beam $L_1$, from the first laser oscillator 14, and the left-hand automobile door 16 is welded by the laser beam $L_2$ from the second laser oscillator 18. In the event of a failure of the second laser oscillator 18, for example, the laser beam path of the laser beam $L_1$ emitted from the first laser oscillator 14 is changed to take over the welding of the left-hand automobile door 16. Therefore, even when the first laser oscillator 14 or the second laser oscillator 18 fails to operate, the entire welding line combined with the laser beam welding apparatus 10 is not required to be shut down, and hence the right- and left-hand automobile doors 12, 16 can be welded highly efficiently.

When the second laser oscillator 18 suffers a malfunction, the left-hand automobile door 16 is welded by the laser beam $L_1$ from the first laser oscillator 14, and while the left-hand automobile door 16 is being thus welded, the malfunctioning second laser oscillator 18 is repaired or replaced. Consequently, the welding line is prevented from being shut down, and can smoothly recover its full functions when the second laser oscillator 18 is back into operation.

The laser beam paths of the laser beams $L_1$, $L_2$ can be changed simply by moving the reflecting mirrors 42, 58, 70b, 72b selectively into and out of the respective laser beam paths. Therefore, the laser beam welding apparatus 10 is relatively simple in its overall structure, and can be manufactured relatively inexpensively.

Figure 7:
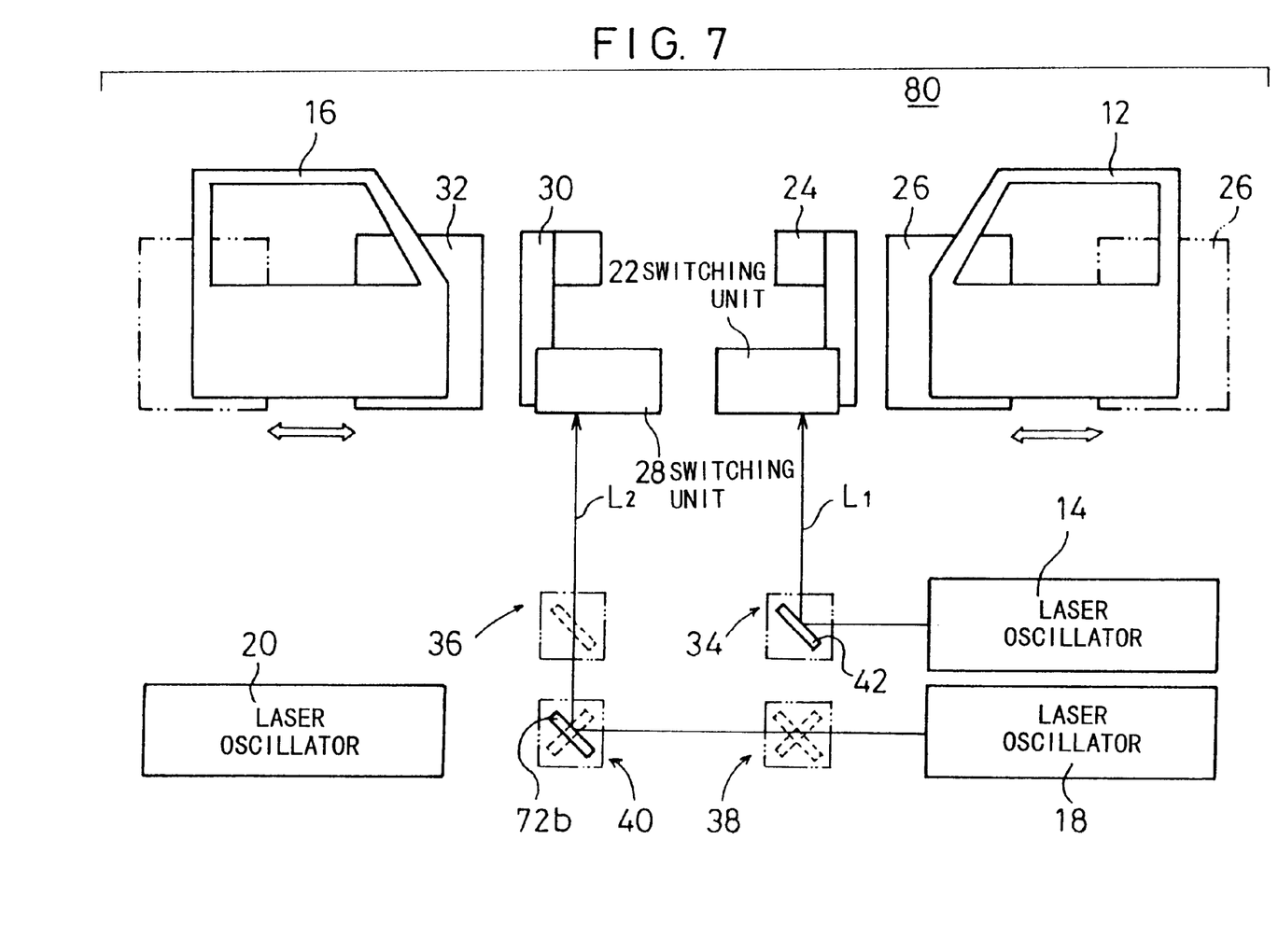
FIG. 7 is a schematic plan view of a laser beam welding apparatus according to a second embodiment of the present invention.

FIG. 7 schematically shows a laser beam welding apparatus 80 according to a second embodiment of the present invention. Those parts of the laser beam welding apparatus 80 which are identical to those of the laser beam welding apparatus 10 according to the first embodiment are denoted by identical reference characters, and will not be described in detail below.

The laser beam welding apparatus 80 is different from the laser beam welding apparatus 10 according to the first embodiment only with respect to the layout of the right- and left-hand automobile doors 12, 16 and hence the layout of the first and second beam switching units 22, 28, the first and second remote heads 24, 26, and the third and fourth remote heads 30, 32. The laser beam welding apparatus 80 operates in the same manner and offers the same advantages as the laser beam welding apparatus 10.

As described above, according to the present invention, different workpiece regions are welded by respective laser beams from a plurality of laser oscillators. In the event of a failure of one of the laser oscillators, the laser beam path of the laser beam emitted from any one of the remaining laser oscillators is changed to apply the laser beam to the workpiece region which has been welded by the laser beam from the laser oscillator which is suffering the failure.

Even when one of the laser oscillators malfunctions, therefore, the overall welding line does not need to be shut down, but another laser oscillator takes over the welding of the workpiece region welded by the malfunctioning laser oscillator, during which time the malfunctioning laser oscillator can be repaired or replaced. Accordingly, the laser beam welding apparatus can smoothly and reliably weld the workpiece regions highly efficiently.

Although certain preferred embodiments of the present invention have been shown and described in detail, it should be understood that various changes and modifications may be made therein without departing from the scope of the appended claims.

What is claimed is:

1. A method of welding a workpiece or workpieces with laser beams, comprising the steps of:

applying laser beams simultaneously from a plurality of laser oscillators to respective regions of the workpiece or workpieces; and if at least one of said laser oscillators fails to operate, changing a laser beam path of the laser beam from a remaining operational one of the laser oscillators by moving a reflecting mirror into or out of the optical path of the remaining operational laser oscillator, to thereby apply said laser beam to the region of the workpiece which has been partially welded by the laser beam from said at least one of said laser oscillators which has failed to operate.

2. A method according to claim 1, further comprising the step of selectively changing the laser beam paths of said laser beams by moving reflecting mirrors selectively into and out of optical paths of said laser oscillators.

3. An apparatus for welding a workpiece or workpieces with laser beams, comprising:

a plurality of laser oscillators for applying laser beams simultaneously to respective regions of the workpiece or workpieces; and a laser beam path changing mechanism for, if at least one of said laser oscillators fails to operate, changing a laser beam path of the laser beam from a remaining operational one of the laser oscillators by moving a reflecting mirror into or out of the optical path of the remaining operational laser oscillator, to thereby apply said laser beam to the region of the workpiece which has been partially welded by the laser beam from said at least one of said laser oscillators which has failed to operate.

4. An apparatus according to claim 3, wherein said laser beam path changing mechanism comprises reflecting mirrors movable selectively into and out of optical paths of said laser oscillators for selectively changing the laser beam paths of said laser oscillators.

5. An apparatus according to claim 4, further comprising:

another laser oscillator for applying a laser beam selectively to the workpiece;

said laser beam path changing mechanism comprising a further reflecting mirror movable selectively into and out of an optical path of said other laser oscillator for selectively changing a laser beam path of said laser beam from said other laser oscillator.

* * * * *